United States Patent [19]

van der Velden et al.

[11] Patent Number: 5,008,591

[45] Date of Patent: Apr. 16, 1991

[54] X-RAY IMAGE INTENSIFIER TUBE COMPRISING A SELECTIVE FILTER

[75] Inventors: Johnny van der Velden; Theodorus F. van Bergen; August L. H. Simons; Johannes K. E. Colditz; Martinus A. C. Ligtenberg; Franciscus M. Dreesen, all of Heerlen, Netherlands

[73] Assignee: U.S. Philips Corp., New York, N.Y.

[21] Appl. No.: 461,885

[22] Filed: Jan. 8, 1990

[30] Foreign Application Priority Data

Jan. 9, 1989 [NL] Netherlands .......................... 8900040

[51] Int. Cl.[5] ........................ H01J 40/18; G01N 21/64

[52] U.S. Cl. ...................................... 313/524; 313/527; 250/487.1

[58] Field of Search ......................... 313/524, 527, 366; 250/213 VT, 487.1

[56] References Cited

U.S. PATENT DOCUMENTS

| | | | |
|---|---|---|---|
| 3,706,885 | 12/1972 | Fister et al. | 250/459.1 |
| 3,838,273 | 9/1974 | Cusano | 250/213 VT |
| 4,398,093 | 8/1983 | Dufay | 250/487.1 |

*Primary Examiner*—Sandra L. O'Shea

*Attorney, Agent, or Firm*—William L. Botjer

[57] ABSTRACT

The entrance screen in an X-ray image intensifier includes an intermediate layer of a material which selectively absorbs photon energy. As a result, the speed of the photo-electrons is substantially reduced, thus improving the imaging. By introducing a radial variation of the absorption in the intermediate layer, vignetting-compensation can also be realized without substantial loss of sensitivity and resolution for the central portion of the tube. The resolution at the periphery of the tube can thus be substantially improved.

11 Claims, 1 Drawing Sheet

X-RAY IMAGE INTENSIFIER TUBE COMPRISING A SELECTIVE FILTER

BACKGROUND OF THE INVENTION

The invention relates to an X-ray image intensifier tube, comprising an entrance screen, an exit screen and electron-optical means for projecting photo-electrons from the entrance screen onto the exit screen, the entrance screen successively comprising a luminescent layer, an intermediate layer and a photocathode.

An X-ray image intensifier tube of this kind is known from U.S. Pat. No. 3,838,273. For a variety of reasons a barrier layer may be provided between the luminescent layer and the photocathode in X-ray image intensifier tubes. An example in this respect is a layer for chemical separation in order to preclude detrimental interaction between the layers; in particular contamination of the photocathode by substances released by the luminescent material, notably during the formation of the photocathode, is to be avoided. An intermediate layer of this kind is described in U.S. Pat. No. 3,706,885.

There may also be provided an intermediate layer which specifically serves to improve the electrical conductivity across the layer in order to prevent the occurrence of charging phenomena causing disturbances in the image. Such a layer is also described in U.S. Pat. No. 3,706,885. A layer for optical adaptation upon transfer of luminescent light from the luminescent layer to the photocathode is described in EP 199 426. An absorbing layer for locally influencing the transfer of luminescent light to the photocathode in a different manner, for example an anti-vignetting layer, is discribed in DE 21.34.110.

Various of these functions can be combined, either by using a multiple layer or by choosing a material such that the layer combines the function of, for examle chemical barrier layer with an improved electrical conductivity and/or optical adaptation. An example in this respect is described in EP 265 997.

The electron-optical system in X-ray image intesifier tubes aims to realize a uniform field strenght on the photocathode surface in order to form a well-defined image of the photo-electrons emanating from the photocathode on the exit screen.

However, regardless of the presence of absence of an intermediate layer, a disturbance which reduces the resolution of the tube always occurs in known tubes, even when the operation of the electron-optical system is optimum.

SUMMARY OF THE INVENTION

It is the object of the invention to mitigate this disturbance; the invention is based on the recognition of the fact that said disturbance could be caused by a comparatively high speed of emergence of photo-electrons from the photocathode in combination with the comparatively large spread in the direction of emergence of the photo-electrons and a spread in the luminescent light due to reflection from the photocathode or from an intermediate layer between the luminescent layer and the photocathode. The speed of emergence of the photo-electrons is strongly influenced by the energy of photons emerging from the luminescent layer in the photocathode. When the photo energy is higher than the energy required for releasing a photo-electron, the additional energy can be imparted to the emerging photo-electrons as kinetic energy. Considering the arbitrary direction of emergence of photo-electrons, this could be the cause of said disturbance in the imaging. In order to eliminate this disturbance, an X-ray image intensifier tube of a kind set forth in accordance with the invention is characterized in that the intermediate layer exhibits a selective absorption for photon energy, so that comparatively high-energetic photons are absorbed more than comparatively low-energetic photons.

Because selective absorption occurs in a tube in accordance with the invention, the photon energy of the photons entering the photocathode is reduced, so that on average the photo-electrons have a lower energy and hence also a more uniform speed of emergence, the absorbing effect of such an intermediate layer reducing the share of photons which have been reflected once and notably those which have been reflected several times. Both factors result in an increased resolution. The disturbance of the imaging due to the high-energetic photo-electrons is thus strongly reduced.

In the preferred embodiment, the luminescent material is formed by sodium-activated CsI and th intermediate layer consists of a translucent semiconductor material having an energy gap of, for example at least 2.8 eV or preferably at least approximately 2.4 eV, which is a suitable value for the desired selective absorption. For thallium-activated CSi the energy gap limits are between approximately 3.0 and 2.0 eV because of the emission curve thereof. Because of its semiconductor nature such an intermediate layer exhibits adequate electrical conductivity to prevent the occurrence of disturbing carging phenomena, so that an additional conductive layer can be dispensed with and a substantially higher resolution can be achieved without significant loss of sensitivity. The absorption material can be chosen from sufficiently translucent and preferably sufficiently electrically conductive materials having an absorption limit, so that particularly the high-energetic light component of the luminescent light is intercepted. For the intermediate layer use can be made of materials exhibiting a substantial absorption for the luminescent light, a stronger absorption being desirable for comparatively shortwave photons, notably in view of photons energy homogenization. Suitable materials are, for example yellowing halogenides such as TiI, InI, BiI etc. Such a layer has a thickness of, for example 1 μm.

In a further preferred embodiment, the intermediate layer exhibits a decreasing absorbtion, proceeding from the centre towards the periphery of the screen, so that the layer also acts as an anti-vignetting filter. The absorption variation can be realized by variation of the layer thickness; however, because of the sensitivity reduction occurring in that case, the absorbtion is preferably made to increase towards the centre by varying the absorption limit, that is to say by introducing an increase mean energy gap of the layer, for example by locally providing an additional layer or more dopant in the material, or by realizing a variation in the material so that from an integral point of view the energy gap is smaller in the centre than at the periphery of the screen. This can also be realized, for example by varying the mixing ratio of a plurality of selectively absorbing materials having a different absorption limit. Notably the resolution at the periphery of the screen can thus be increased by dispensing with the customary increasing thickness of the luminescent layer from the centre towards the periphery, or even by constructing the layer to be thinner at the periphery, considering the inclined incidence of the X-ray beam at that area, with additionally selective absorption in the central portion.

Preferably, a material which is suitable for vapour deposition is used for the intermediate layer, but the layer can alternatively be provided by means of plasma deposition, spray deposition, sputtering deposition and the like.

BRIEF DESCRIPTION OF THE DRAWING

Some preferred embodiments in accordance with the invention will be described in detail hereinafter with reference to the accompanying drawing. Therein.

Figure 1:
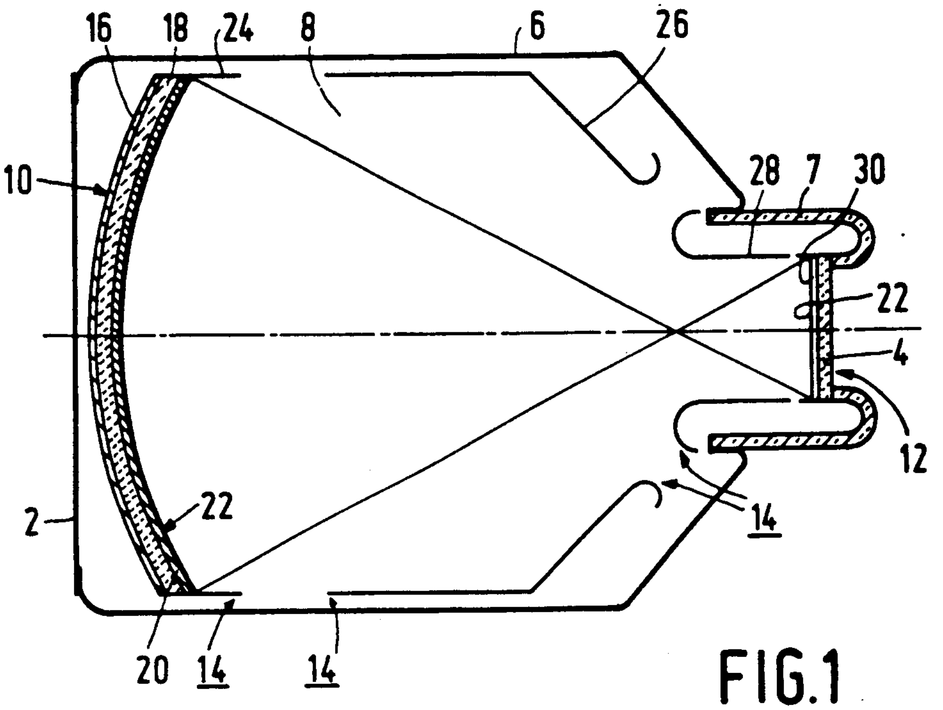
FIG. 1 shows an X-ray image intensifier tube in accordance with the invention.

DETAILED DESCRIPTION OF THE PREFERRED EMBODIMENTS an X-ray image intensifier tube as shown in FIG. 1 comprises an entrance window 2, an exit window 4 and a cylindrical envelope 6 which together enclose an evacuated space 8. The space 8 accommodates an entrance screen 10, an exit screen 12 and an electron-optical imaging system 14. In this case the entrance screen of the tube is formed by a foil of, for example titanium. A titanium entrance window need not be thicker than, for example approximately 0.2 mm, not even for tubes comprising a large entrance window, so that the dispersion of an X-ray beam to be detected is only slight therein. The entrance screen comprises a concave support 16 which is preferably made of aluminium and which also be thin because it does not serve as a vacuum wall. On the support there is provided a layer of luminescent material 18 on which there is provided a photocathode 22 with an intermediate barrier layer 20. The entrance screen constitutes, for example in conjunction with a shielding ring 24, a first electrode of the electron-optical imaging system 14 which also includes a focusing electrode 26, a first anode 28 and an output anode 30 which preferably electrically contacts the exit shield in the present embodiment. The exit screen 12 is arranged directly on the exit window 4, possibly via an intermediate fibre-optical plate. The envelope 6 of the housing has a circular cross-section in the present embodiment, but may also be constructed so as to be rectangular, together with the exit window, the entrance screen and possibly the exit screen and the exit window.

Figure 2:
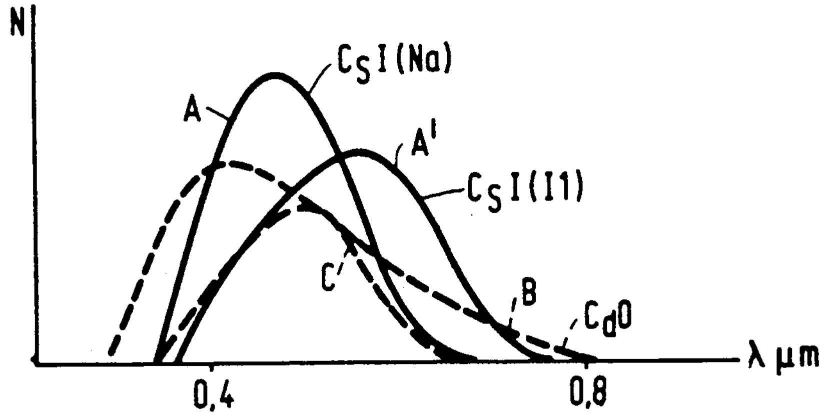
FIG. 2 shows a graph with emission curves, an absorption curve and a curve for transmitted luminescent light for an entrance screen.

In accordance with the invention, the intermediate layer 20 consists of a translucent semiconductor material having an energy gap larger than, for example 2.0 eV, so that relatively high-energetic (i.e. comparatively short-wave) photons from the luminescent light are intercepted to a comparatively high degree. For such interception it is not necessary for the intermediate layer to be thick, so that no substantial dispersion of the luminescent light occurs. In the graph of FIG. 2 the number of photons is plotted horizontally and the photon wavelenght is plotted vertically; a curve A represents the emission distribution of a CsI (Na) luminescent layer (curve A' refers to CsI(T1)); a curve B represents the absorption of a CdO intermediate layer, and a curve C represents the photon energy distribution of the luminescent light which enters the photocathode after having passed the CdO layer. Therefore, the intercepted light has been shifted to a range of longer wavelength and hence lower photon energy. For a photo-electron exit potential corresponding to a photon wavelength of for example 0.4 μm, the mean photo-electron energy is decreased from approximately 0.7 eV to approximately 0.4 eV by the introducing of the CdO intermediate layer.

Figure 3:
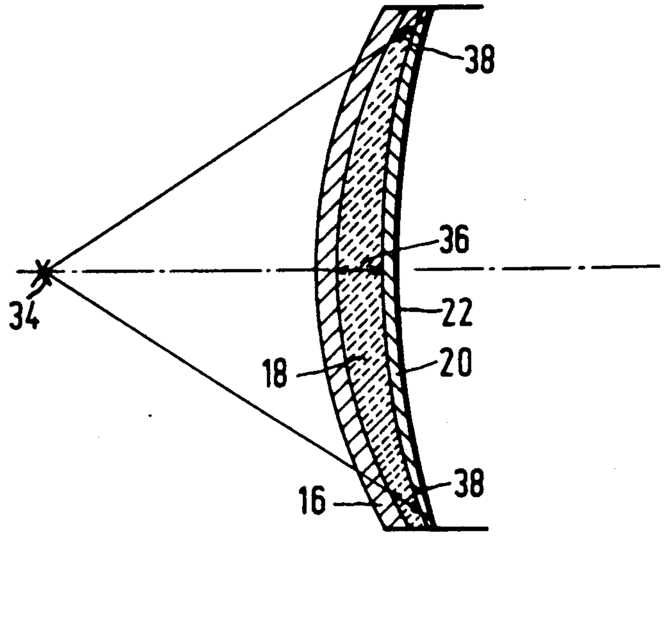
FIG. 3 shows an example of an appropriate entrance screen.

Like the luminescent layer, the barrier layer 20 is diagrammatically shown so as to have a uniform thickness in FIG. 1. In practical tubes the thickness of the luminescent layer is often increased towards the periphery of the screen in order to reduce vignetting in the image. However, the resolution then decreases towards the periphery of the image. This is also the case, be it to a lesser extent, when the luminescent layer has a columnar structure as described in U.S. Pat. No. 3,825,763. If the luminescent layer is constructed so as to be thicker as made possible by the columnar structure, a radial thickness variation across the screen no longer makes a substantial contributing to anti-vignetting An attractive embodiment in accordance with the invention is achieved by imparting a radial absorption variation, for example by way of thickness variation, to a selectively absorbing layer, so that the layer also acts as an anti-vignetting layer, notably also because of intensified reflected photons. As has already been stated, a radially varying integral energy gap can be imparted to the layer, for example by variation of the dopant or by variation of the layer material. Both methods for absorption variations can also be combined so that an attractive compromise is obtained. For example, when CsI is used as the luminescent material, in addition to said hologenides use can be made of CdO, CdS, InO, ZnO, SnO (doped or not) or possibly other composite materials whose integral energy gap increases from the periphery towards the centre from, for example approximately 2.0 to 2.5 eV to from 2.5 to 3.0 eV. Because the intermediate layer performs the function of anti-vignetting layer, the thickness variation of the luminescent layer need no longer be taken into account in this respect, so that use can again be made of a luminescent layer of uniform thickness. As a result, in addition to a higher peripheral resolution improved uniformity of brightness can be achieved. By constructing the luminescent layer so as to become thinner towards the periphery, the negative effect on the resolution at that area, caused by the obligue incidence of the X-rays in the conical X-ray beam and the customary curvature of the entrance screen, can be taken into account. The layer may exhibit, for example a variation such that the length of the path of X-ray quanta through the layer is substantially the same across the entire entrance screen. An example of such a screen is illustrated in FIG. 3 which shows an X-ray source 34 with a support 16 consisting of an aluminium foil having a uniform thickness of, for example 200 μm, a luminescent layer 18 with a thickness variation from 200 μm at the periphery to approximately 350 μm in the centre so that the path length 36 and 38 for the X-ray quanta are the same, an intermediate layer 20 having a thickness which increases from the centre towards the periphery from, for example 20 μm to 10 μm so that vignetting is compensated for, and a photocathode 22 having a uniform thickness of, for example from 10 to 100 nm.

In an intermediate layer of this kind, in the centre fewer photons traversing the intermediate layer, i.e. after reflection from the photocathode side of the layer 20 or subsequent reflection from the side of the luminescent layer, will reach the photocathode, so that the dispersion of light is reduced. An intermediate layer 20 then acts as a substrate for the photocathode. Because of the higher density of CsI layers vapour-deposited at higher temperatures, for example as stated in U.S. Pat. No. 4,820,926, the intermediate layer 20 may also be formed by an outer layer of CsI whereto a desired absorption is imparted by suitable doping, for example using one or more of said halogenides. Because the layer 20 has a thickness of the most approximately 25 µm, the absence of a light-collimating structure therein will not have a disturbing effect.

We claim:

1. An X-ray image intesifier tube, comprising an entrance screen, an exit screen and electron-optical means for projecting photo-electrons from the entrance screen onto the exit screen, the entrance screen successively comprising a luminescent layer, an intermediate layer and a photocathode, characterized in that the intermediate layer exhibits a selective absorption for photon energy, so that comparitively high-energetic photons are absorbed more than comparatively low-energetic photons.

2. An X-ray image intensifier tube as claimed in claim 1, characterized in that the luminescent layer contains CSi, the intermediate layer containing a semiconductor material with an energy gap of at least from approximately 2.0 to 3.0 eV.

3. An X-ray image intesifier tube as claim in claim 1, characterized in that the luminescent layer contains CsI (Na), the intermediate layer containing a semiconductor material with an energy gap of approximately 2.6 eV.

4. An X-ray image intensifier tube as claimed in claim 1, characterized in that the intermediate layer consists mainly of CdO or CdS.

5. An X-ray image intesifier tube as claimed in claim 1, characterized in that the intermediate layer exhibits a radial thickness variation.

6. An X-ray image intensifier tube as claimed in claim 1, characterized in that the intermediate layer exhibits a radial variation of the integral energy gap.

7. An X-ray image intensifier tube as claimed in claim 5, characterized in that the luminescent layer has a uniform thickness.

8. An X-ray image intensifier tube as claimed in claim 5, characterized in that the luminescent layer has a decreasing thickness in the direction of the periphery, which decrease is adapted to an X-ray beam geometry to be used.

9. An X-ray image intensifier tube as claimed in claim 1, characterized in that the intermediate layer exhibits a comparitively high absorption for the luminescent light in order to reduce photon reflecting therein.

10. An X-ray image intensifier tube as claimed in claim 9, characterized in that the intermediate layer contains a yellowing halogenide.

11. An X-ray image intensifier tube as claimed in claim 1, characterized in that the intermediate layer is formed by an outer layer of CsI doped for increased absorption of the luminescent light.

* * * * *